(12) United States Patent
Bateman et al.

(10) Patent No.: US 7,174,922 B2
(45) Date of Patent: *Feb. 13, 2007

(54) COMPOSITE STRIP WINDABLE TO FORM A HELICAL PIPE AND METHOD THEREFOR

(75) Inventors: Ian Roger Bateman, Happy Valley (AU); Gulcay Uysal, Seacliff Park (AU)

(73) Assignee: Rib Loc Australia Pty Ltd., Gepps Cross (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,285

(22) Filed: Feb. 6, 2006

(65) Prior Publication Data

US 2006/0174959 A1 Aug. 10, 2006

(51) Int. Cl.
*F16L 9/16* (2006.01)

(52) U.S. Cl. ............... 138/129; 138/154; 138/173; 138/174; 138/122

(58) Field of Classification Search ........ 138/129, 138/154, 121, 122, 172–174; 29/514, 429; 156/143, 195
See application file for complete search history.

(56) References Cited

U.S. PATENT DOCUMENTS 3,890,181 A * 6/1975 Stent et al. ............ 156/143
4,172,474 A * 10/1979 Stahl ..................... 138/132
4,173,670 A * 11/1979 VanAuken ............. 138/123
4,734,145 A * 3/1988 Monia .................. 156/244.11
7,004,202 B2 * 2/2006 Bateman et al. ......... 138/129

FOREIGN PATENT DOCUMENTS

| EP | 0 535 326 A2 | 4/1993 |
| GB | 2 143 002 A | 1/1985 |
| JP | 62-245632 | 9/1987 |
| JP | 08-128505 | 5/1996 |
| WO | WO 89/11963 | 12/1989 |
| WO | WO 93/07412 | 4/1993 |
| WO | WO 99/08033 | 2/1999 |

* cited by examiner

*Primary Examiner*—Patrick F. Brinson
(74) *Attorney, Agent, or Firm*—Klauber & Jackson

(57) ABSTRACT

A composite strip 10 windable to form a helical pipe is disclosed. The composite strip 10 comprises: an elongate plastic strip 11 having a base portion 12 and at least one lengthwise extending rib portion 20 upstanding from the base portion 12; and an elongate reinforcing strip 30 extending lengthwise and supported laterally by the rib portion 20, the reinforcing strip 30 having a height to thickness ratio of at least three to one and orientated substantially perpendicular to the base portion 12. When wound into a helical pipe, the reinforcing strip 30 reinforces the pipe against radial crushing loads. A bead 40 seals the reinforcing strip 30 from the environment. Desirably the composite strip 10 further comprises: a planar lamina 50 extending lengthwise and bonded to the base portion 12, the lamina 50 having a higher Young's modulus and strength than those of the plastic strip 11. The lamina 50 greatly improves the pressure rating of a pipe wound from the strip 10.

17 Claims, 8 Drawing Sheets

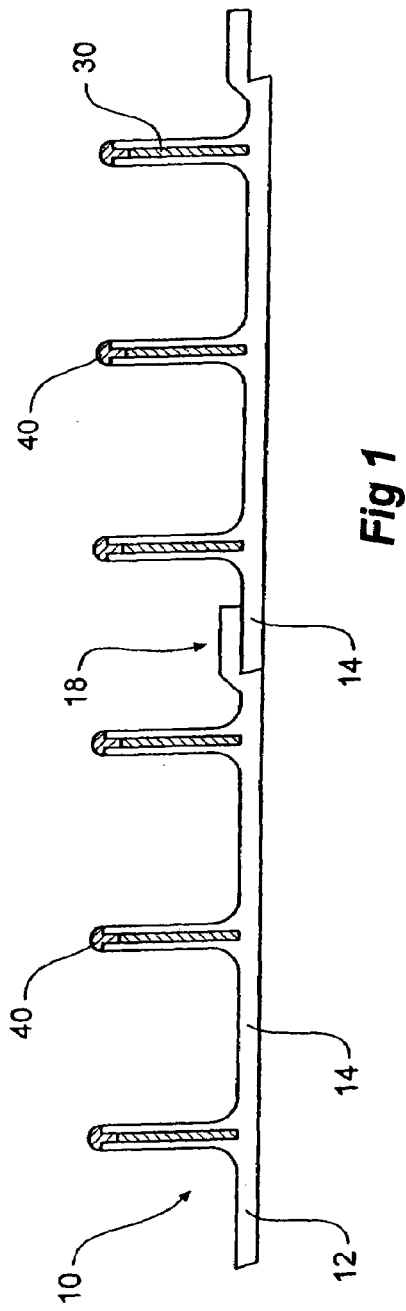
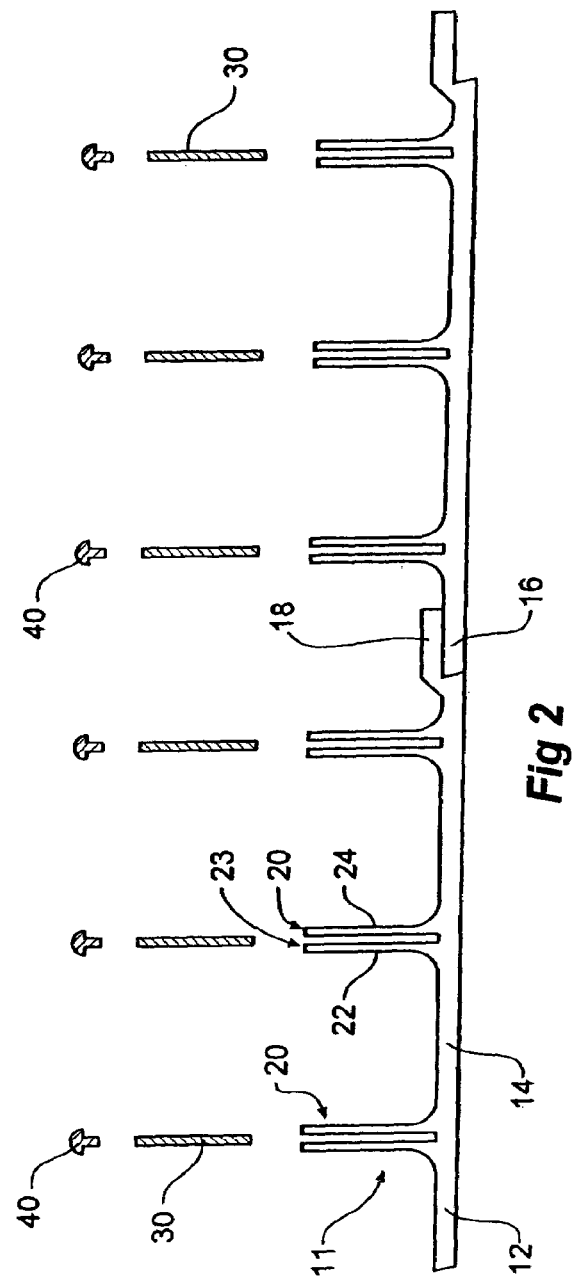

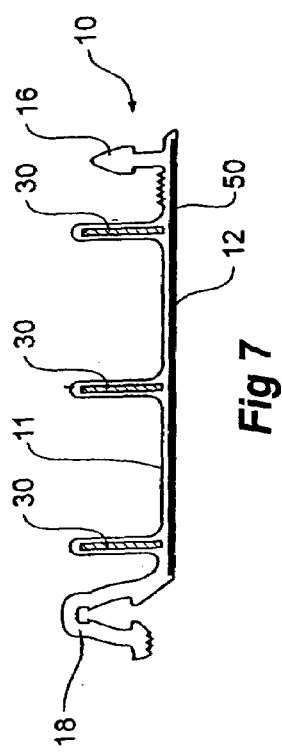
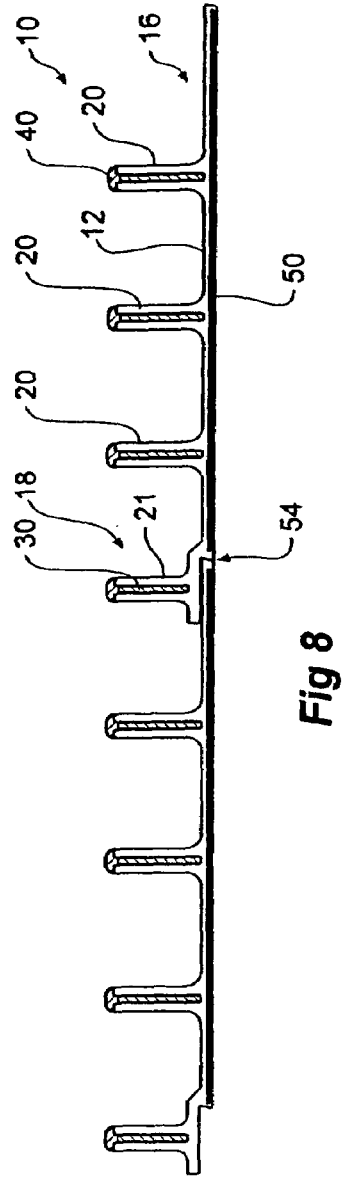
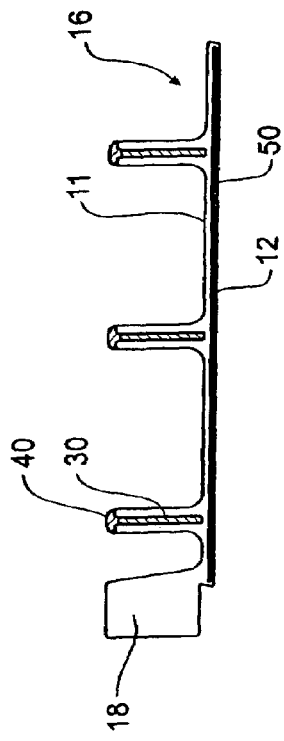
Fig 7
Fig 8
Fig 9

COMPOSITE STRIP WINDABLE TO FORM A HELICAL PIPE AND METHOD THEREFOR

FIELD OF THE INVENTION

This invention relates to improvements to reinforced ribbed structures, and in particular to reinforced or strengthened helically wound pipes or tubes made from a composite of materials.

BACKGROUND

It is well known that plastic pipes can be made by helically winding a plastic strip having a series of spaced apart upstanding ribs extending longitudinally of the strip, either at room temperature or at an elevated temperature where the plastic becomes more flexible. This form of helically wound tube is already well known in the piping industry and is described in patents by the applicant relating both to the form of the plastic strip and the form of the machine by means of which the pipes or tubes are produced from such strips.

For these pipes to perform in a high performance applications, in order to attain the necessary degree of strength, the wall thickness of the plastic strip must be quite substantial, as well as that of the ribs. Alternatively the finished pipes or tubes can be reinforced with strengthening or reinforcing members.

In applications where the reinforced tubes or pipes are buried in a trench or subjected to high earth loads, the strength of the pipe or tube is of extreme importance.

The applicant's Australian Patent No. 607431 discloses a method of producing a reinforced plastics tube utilising a reinforcing member placed between the ribs in such a manner that the deflection resistance of the finished pipe or tube is materially increased. The reinforcing member comprises a metal member having a profile of U-shape cross-section, the free ends of the reinforcing member being designed to engage beneath opposed flange formations of a pair of adjacent ribs to thereby lock the metal strip in position between the ribs and in turn stiffen the ribs and the finished pipe.

The applicant's Australian Patent No. 661047 discloses an improvement over the disclosure of Australian Patent No. 607431 referred to above. The improvement is provided by the provision of a reinforcing member having a central body portion of inverted U or V-shaped cross-section that has a radial height greater than the height of the ribs whereby the effective external diameter of the composite pipe is substantially increased. This provides a stiffer pipe.

Known helically wound composite pipes are formed in a multi-stage operation. The plastic body is extruded and then is helically wound to form a pipe. Elongate steel reinforcing members are separately roll-formed into a profile providing the required stiffness (such as the inverted U or V-shaped profiles referred to above). The roll formed steel profile is then rolled to a radius approximating that of the helically wound plastics body. Finally, the profiled and radiused reinforcing member or members are wound on to the outside of the plastics pipe to form a composite pipe of the requisite stiffness.

When using the reinforcing members disclosed in Australian Patent Nos 607431 and 661047, the step of rolling the steel reinforcing member to a radius of approximating that of the plastics pipe involves straining the steel reinforcing member beyond its elastic limit. This requires the application of considerable force during the rolling process. In contrast, winding of the extruded plastics profile into a helical pipe generally requires much less force due to the material properties of the plastics.

An object of the present invention is to provide certain improvements, beyond those disclosed in the aforesaid Patent Specifications 607431 and 661047, to reinforced helically wound plastics tube or pipe, which are effective to stiffen the tube or pipe through the addition of reinforcing members formed of plastics material and/or of metal to thereby produce a composite plastics and metal structure.

It is another object of the invention to provide an improved composite strip that can be wound formable into a helical pipe or tube without the need for the addition of a reinforcing member during or after the pipe winding process. It is also an object of the invention to provide a method of producing such a composite strip.

It is yet another object of the present invention to provide a method of producing a helically wound pipe that obviates the need for pre-rolling the reinforcing member before it is introduced into the plastics body of the strip.

It is yet another object of the present invention to provide a helically wound plastics pipe formed of two or more materials having different characteristics so that the resultant or finished pipe or tube has enhanced properties, and which can be produced at relatively low cost.

It is yet another object of the present invention to provide a helically wound plastic pipe with a high pressure rating, that is, a pipe that is capable of withstanding high internal pressure without failure.

SUMMARY OF THE INVENTION

According to a first aspect of the invention there is provided a composite strip windable to form a helical pipe, the composite strip comprising:

an elongate plastic strip having a base portion and at least one lengthwise extending rib portion upstanding from the base portion; and an elongate reinforcing strip extending lengthwise and supported laterally by the rib portion, the reinforcing strip having a height to thickness ratio of at least three to one and orientated substantially perpendicular to the base portion, wherein, when wound into a helical pipe, the reinforcing strip reinforces the pipe against radial crushing loads.

Preferably said height to thickness ratio is at least four to one.

Preferably the rib portion defines a lengthwise extending slot in which the reinforcing strip is retained, the reinforcing strip being laterally supported by the walls of the slot.

Preferably the rib portion comprises a pair of parallel walls extending lengthwise along the base portion, the parallel walls orientated substantially perpendicular to the base portion.

Preferably the reinforcing strip is continuous and has a length which is co-extensive with the plastic strip.

Preferably the reinforcing strip is completely encapsulated so as to prevent exposure to the environment.

Preferably the plastic strip has an array of lengthwise extending slot forming rib portions spaced apart across the width of the strip, each rib portion supporting an elongate reinforcing strip.

The composite strip may include various materials, however, preferably the reinforcing strip is constructed from metal. More particularly, preferably the reinforcing strip is constructed from steel.

According to a second aspect of the invention there is provided a composite strip windable to form a helical pipe, the composite strip comprising:

an elongate plastic strip having a base portion and a lengthwise extending rib portion upstanding from the base portion;

an elongate planar reinforcing strip extending lengthwise and supported by the rib portion, the reinforcing strip having a height to thickness ratio of at least three to one and orientated substantially perpendicular to the base portion; and a planar lamina extending lengthwise and bonded to the base portion, the lamina having a higher Young's modulus and strength than those of the plastic strip, wherein, when wound into a helical pipe, the reinforcing strip reinforces the pipe against radial crushing loads and the lamina improves the pressure rating of the pipe.

Preferably said height to thickness ratio is at least four to one.

According to a third aspect of the invention there is provided a helically wound composite pipe produced from a composite strip, the composite strip comprising:

an elongate plastic strip having a base portion that forms the inside of the wound pipe and a lengthwise extending rib portion upstanding from the base portion; and an elongate metal reinforcing strip extending lengthwise and supported by the rib portion, the reinforcing strip having a height to thickness ratio of at least three to one and orientated substantially perpendicular to the flat side of the base portion, wherein the orientation of the reinforcing strip with respect to the base portion remains substantially unchanged after the winding of the strip to form the pipe.

Preferably said height to thickness ratio is at least four to one.

Preferably the reinforcing strip is continuous and has a length which is co-extensive with the pipe.

Preferably the reinforcing strip is constructed from metal. Preferably the metal is steel.

Desirably the composite strip further comprises:
a planar lamina extending lengthwise and bonded to the base portion, the lamina having a higher Young's modulus and strength than those of the plastic strip.

According to a fourth aspect of the invention there is provided a method of producing a helically wound steel reinforced plastics pipe comprising the steps of:

extruding a plastics profile having a base portion and a lengthwise extending rib portion upstanding from the base portion;

introducing an elongate straight edged reinforcing strip so as to extend lengthwise of the rib portion and supported laterally thereby, the metal strip having a height to thickness ratio of at least three to one and orientated substantially perpendicular to the flat side of the base portion, thereby producing a straight composite strip;

helically winding the composite strip; and inter-engaging the adjacent edges of adjacent convolutions of the strip so as to form a helical pipe.

Preferably the rib portion is extruded to define a lengthwise extending slot shaped to receive and support the reinforcing strip.

Preferably the rib portion is extruded to comprise a pair of parallel walls extending lengthwise along the base portion, the walls orientated substantially perpendicular to the flat side.

Preferably the method further comprises the step of encapsulating the reinforcing strip.

Preferably the extruding and introducing steps occur together in a cross-head extrusion die.

According to a fifth aspect of the invention there is provided a method of producing a helically wound steel reinforced plastics pipe comprising the steps of:

extruding a plastics profile having a base portion and a lengthwise extending rib portion upstanding from the base portion; and introducing an elongate metal reinforcing strip into the rib portion, the metal strip having a height to thickness ratio of at least three to one and orientated substantially perpendicular to the base portion, thereby producing a composite strip;

bonding a lamina to the flat side of the base portion, the lamina having a higher Young's modulus and strength than those of plastic strip; and helically winding the composite strip; and inter-engaging the adjacent edges of adjacent convolutions of the strip so as to form a helical pipe.

Preferably the method has further steps between the bonding and helically winding steps, the further steps comprising:

directing the straight composite step to a spool having a hub rotating about a substantially horizontal axis, with the base portion of the strip facing the underside of the hub;

driving the spool so as to pull the straight composite strip towards the spool and so as to wind the strip around the hub of the spool from its underside;

transporting the spool to a site; and unwinding the strip from the spool.

DETAIL DESCRIPTION OF PREFERRED EMBODIMENTS OF THE INVENTION

Several preferred embodiments of the invention are illustrated in the accompanying representations in which:

FIG. 1 shows a cross-sectional view of a composite strip according to a first embodiment of the invention.

FIG. 2 shows an exploded view of the strip of FIG. 1.

FIG. 7 shows a cross sectional view of a composite strip according to a second embodiment of the invention.

FIG. 8 shows a cross sectional view of adjacent convolutions of a composite strip according to a third embodiment of the invention.

FIG. 9 shows a cross sectional view of a composite strip according to a fourth embodiment of the invention.

Figure 3:
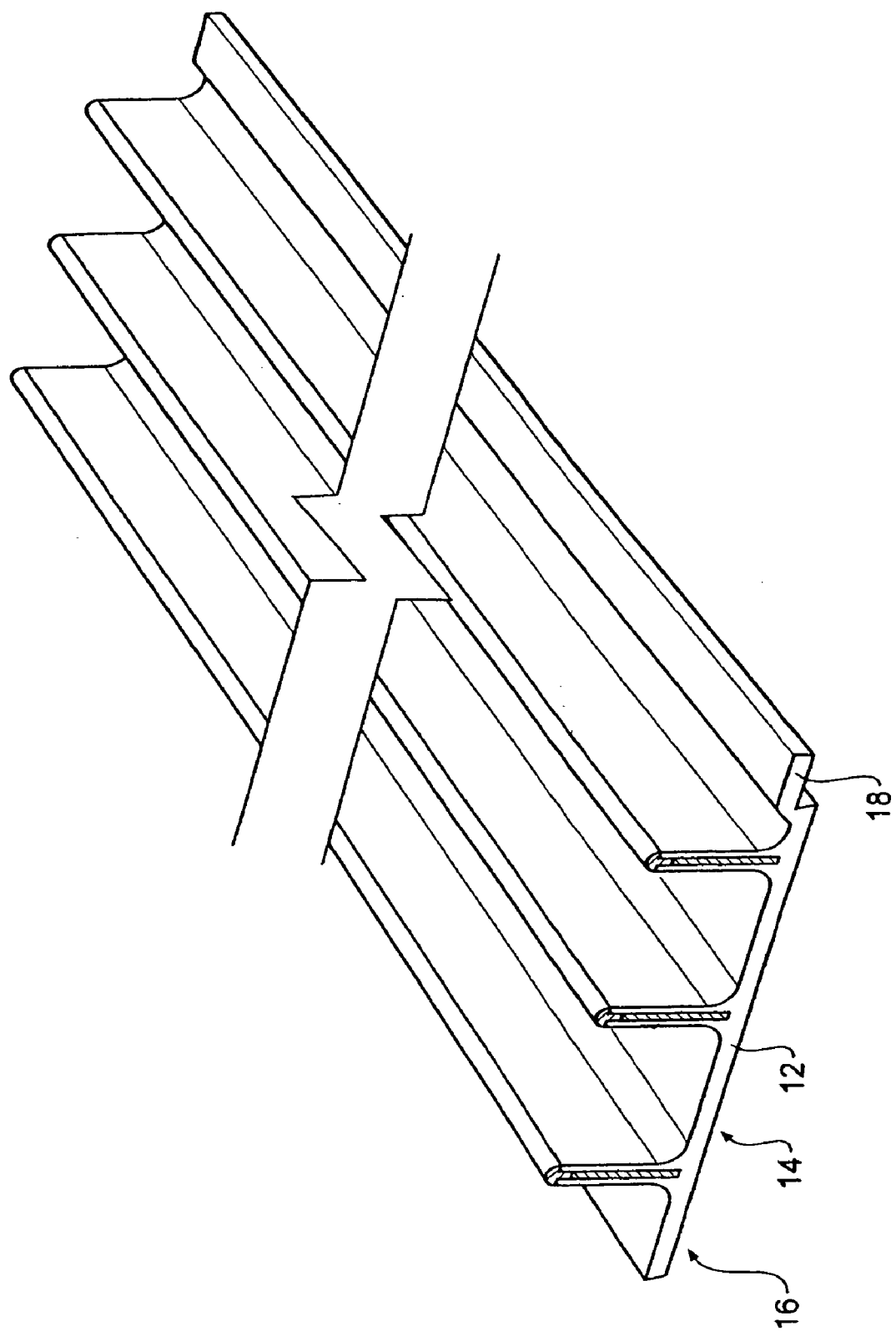
FIG. 3 is a perspective view of the composite strip shown in FIG. 1.

Referring to FIGS. 1 and 2, an elongate composite strip 10 that is windable to form a helical pipe is shown. The composite strip 10 comprises an elongate plastic strip 11 and an elongate metal reinforcing strip 30. The plastic used for this embodiment of the invention is polyethylene although other suitable plastics may be used.

The plastic strip 11 has a base portion 12 with a substantially flat side 14. A plurality of length-wise extending rib portions 20 projects upward from the base portion 12. In this embodiment, each rib portion 20 comprises a pair of parallel walls 22 and 24 that extend length-wise along the base portion 12 to define a length wise extending slot 23. The slot 23 is sized and shaped to snugly receive the reinforcing strip 30 as shown best in FIG. 2.

A bead of plastics 40 is positioned to bridge the gap between the upper ends of the rib walls 22 and 24 and thereby en-capsulate the reinforcing strip 30 completely. This prevents exposure of the reinforcing strip 30 to the environment and therefore assists in preventing corrosion.

In the first embodiment of the invention, an array of three lengthwise extending rib portions 20 spaced apart across the width of the strip are provided. Each rib portion 20 supports a corresponding elongate planar metal reinforcing strip 30. In other embodiments of the invention, more or less ribs and reinforcing strips may be used. The ribs 20 that support the elongate metal reinforcing strips 30 need not be continuous. The ribs 20 can be any shape provided they support the vertically oriented reinforcing strips 30.

Figure 4:
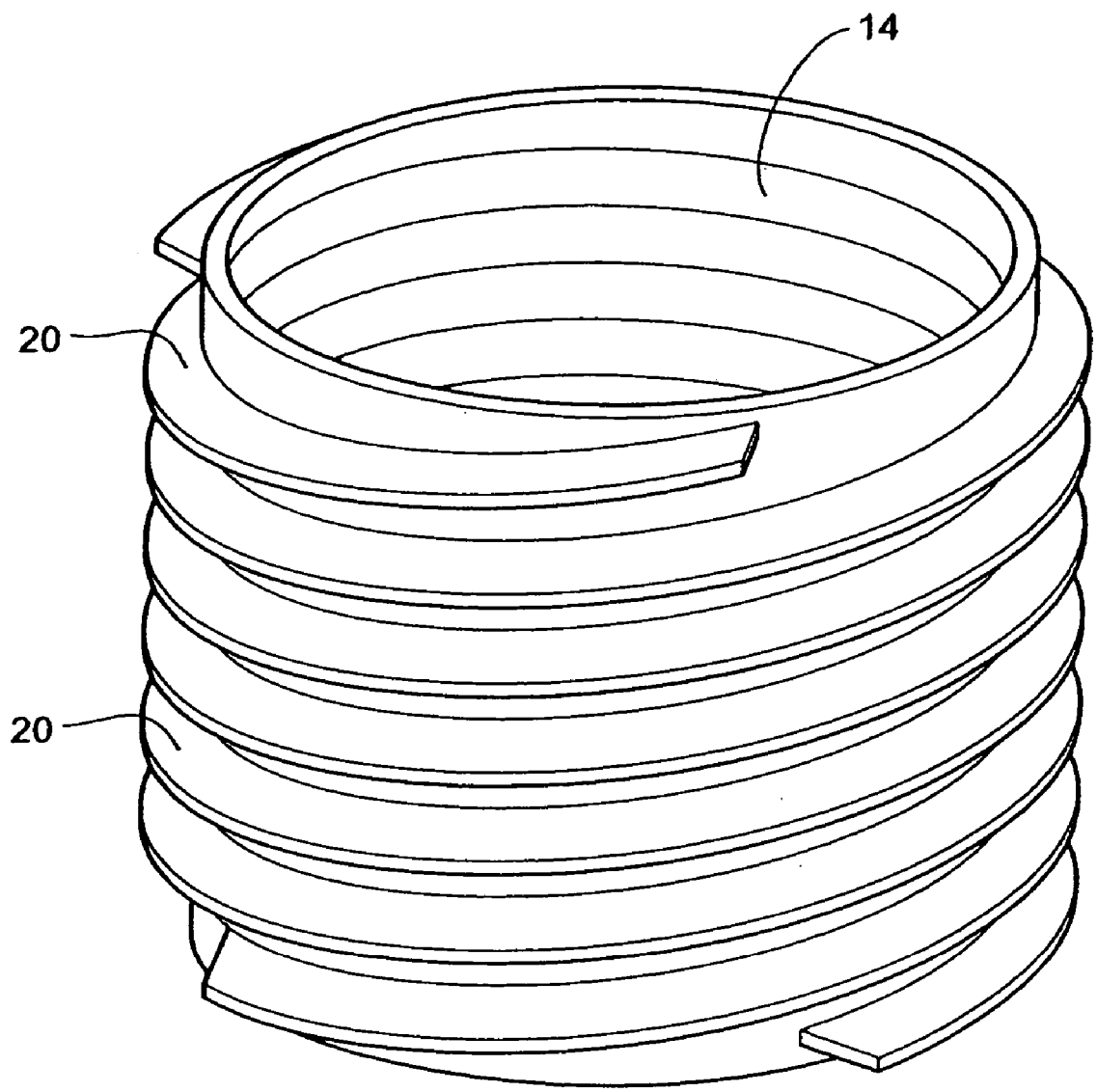
FIG. 4 is a perspective view of a helically wound composite pipe wound from the profile shown in FIGS. 1 and 3.

Referring to FIG. 4, a helically wound composite pipe produced by helically winding the composite strip shown in FIGS. 1, 2 and 3 is shown. The joint between adjacent edges 18 and 16 of adjacent convolutions of the strip is best seen in cross-section in FIG. 1.

Comparing FIGS. 1 and 4, it is apparent that the orientation of the reinforcing strips 30 with respect to the flat side 14 of the base portion 12 remains substantially unchanged after the winding of the strip to form the pipe. The rib portions 20 provide support for the reinforcing strips 30 particularly during the winding of the strip 10. During winding of the strip 10 to form a helical pipe, the reinforcing strips 30 are bent about an axis substantially transverse to the strip 10. This causes plastic deformation of the reinforcing strips 30. The rib portions 20 assist in preventing the reinforcing strips 30 collapsing sideways and towards the base of the plastic strip 12.

Figure 5:
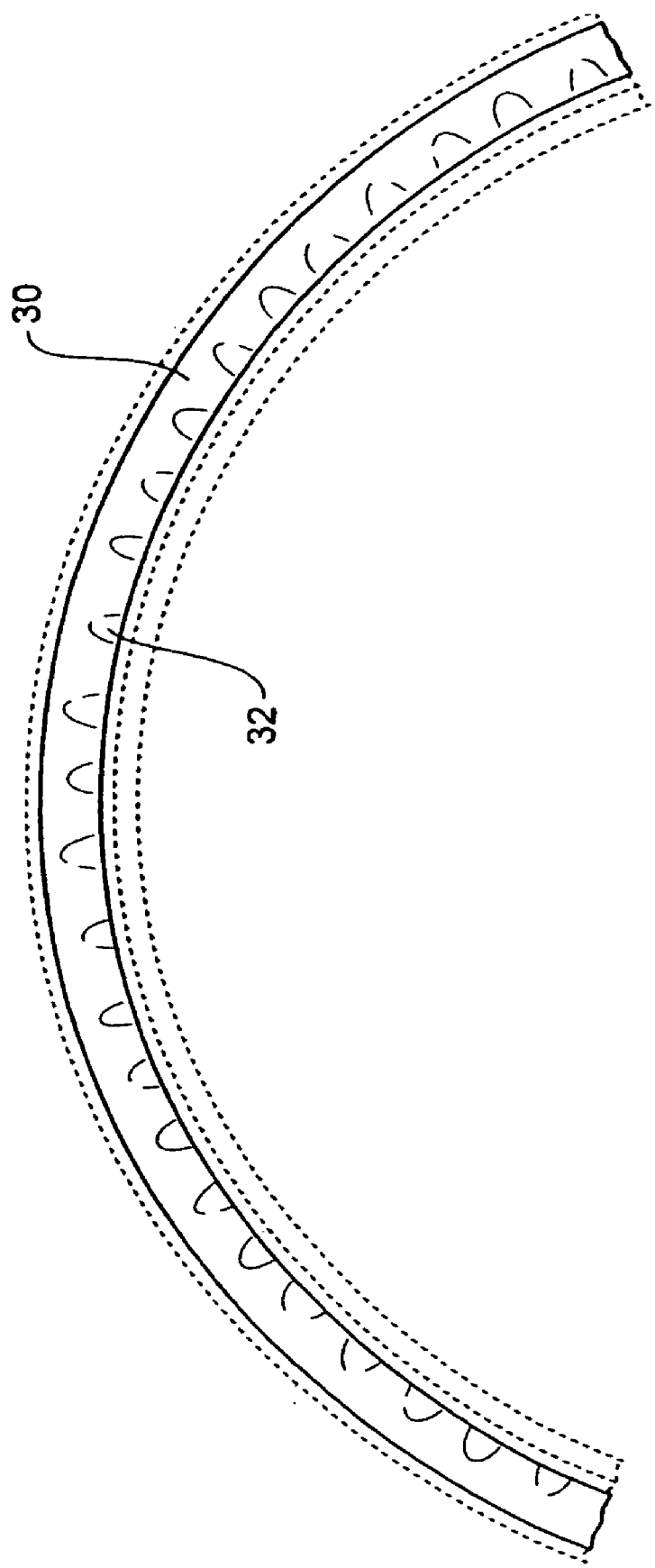
FIG. 5 shows a part-sectional view of the pipe of FIG. 4 revealing the reinforcing element.

FIG. 5 shows an arc-shaped portion of a reinforcing member 30 after it has been bent to wind the pipe shown in FIG. 4. Small areas of buckling 32 are illustrated.

It is important that these areas of buckling are either non-existent or relatively small. If excessive buckling is present, the ability of the pipe to withstand radial crushing loads is compromised.

It is also important to keep the mass of the profile to a minimum while at the same time maintaining the performance criteria to ensure material costs are minimised.

The dimensions and shapes of the plastic strip 12 and the elongate metal reinforcing strips 30 can be varied to suit the diameter of the pipe to be wound. The below table shows a range of configurations suitable for pipes of internal diameter ranging from 300 to 600 millimetres.

| Internal Diameter mm | Steel Thickness Mm | Steel Height mm | Height to Thickness Ratio | No. of Steel bands | Steel Material |
|---|---|---|---|---|---|
| 150 | 0.6 | 4 | 6.7:1 | 3 | CA3 SNG |
| 300 | 0.6 | 12 | 20:1 | 3 | CA3 SNG |
| 375 | 0.6 | 12 | 20:1 | 3 | CA3 SNG |
| 450 | 0.6 | 14 | 23:1 | 3 | CA3 SNG |
| 525 | 0.6 | 16 | 27:1 | 3 | CA3 SNG |
| 600 | 0.8 | 16 | 20:1 | 3 | CA3 SNG |
| 675 | 1.0 | 16 | 16:1 | 3 | CA3 SNG |
| 750 | 1.2 | 16 | 13:1 | 3 | CA3 SNG |
| 825 | 1.6 | 16 | 10:1 | 3 | CA3 SNG |
| 900 | 1.6 | 16 | 10:1 | 3 | CA3 SNG |
| 1050 | 1 | 19 | 19:1 | 3 | CA3 SNG |
| 1200 | 1.2 | 19 | 16:1 | 3 | CA3 SNG |

CA3 SNG: Uncoated cold rolled mild steel.

The height, thickness and number of steel reinforcing bands used are variables that influence the stiffness of the wound pipe. With pipes of larger diameter, the contribution of the plastic to the stiffness of the pipe is relatively small (<10%). With pipes of smaller diameter the contribution of the plastic to the stiffness of the pipe is higher (approximately 30% for a pipe having internal diameter of 300 mm).

The height to thickness ratio of the reinforcing strips 30 are important for a number of reasons. Reinforcing strips having a high height to thickness ratio are preferable from the point of view of pipe stiffness and efficient use of material but this must be weighed against the instability that may result. Instability may cause the reinforcing strips 30 to collapse sideways towards the base of the plastic strip 12 or may cause excessive buckling (buckling is illustrated in FIG. 5).

Selection of a steel with the optimum Young's modulus (or tensile modulus) and yield strength for this application is also important. Where yield strength is excessive, buckling is more likely.

With the range of profiles described in the above table, and with a rib portion thickness range of 1.4 to 1.8 mm, pipes can be wound that are stable of relatively low weight and have excellent resistance to radial crushing loads.

Although the embodiment described above uses steel reinforcing, elongate planar reinforcing strips constructed from other materials may be used.

The addition of the reinforcing strips 30 to the plastic strip 12 can also assist in improving the pressure rating of the pipe. The composite strips described above can further incorporate other elements to improve the pressure rating of the wound pipe. For instance, lamina of fibre fabric (eg glass fibre), plastic or steel may be provided to improve the pressure rating of the pipe. Any material having a Young's modulus and strength that exceeds that of the plastics material of the strip can be used. The lamina may be incorporated into the profile (strip 12) in any suitable way. For instance, the lamina may be welded to the base of the strip 12 or may be cross-head extruded into the base of the strip 12.

Improved interlocking edge features may also be provided to enhance the pressure rating of the pipe. Examples of profiles constructed for high-pressure applications are shown in FIGS. 7 through to 13.

Referring to FIG. 7, a second embodiment of the invention is shown where the composite strip 10 is extruded from PVC. A mechanical lock is provided by a male edge member 16 and a female edge member 18 formed from the plastic strip 11. Reinforcing strips 30 of the type described above are also provided. This profile is cross head extruded encapsulating the reinforcing strips 30 as the composite strip 10 is produced obviating the need to add a sealing bead as previously described. A lamina 50 is incorporated into the base portion of the strip 11. The lamina 50 has a higher Young's modulus and strength than the PVC plastic strip 11. When wound into a helical pipe, this profile can provide a high pressure pipe suitable for conveying fluids under pressure. Although adjacent convolutions are not directly bound together, the thickness of the plastic and design of the mechanical lock formed by adjacent edges 16 and 18 ensures that the pipe is able to withstand significant internal pressures.

FIG. 8 shows a cross sectional view of two adjacent convolutions of composite strip 10 according to a third embodiment of the invention. This composite strip 10 comprises a polyethylene extruded strip 11 having three rib portions 20 extending from a base portion 12, each rib portion 20 supporting a reinforcing strip 30. A fourth rib portion 21 supporting a fourth reinforcing member 31 is also provided. The location of the fourth rib 21 and reinforcing strip 31 is at the edge of the profile to strengthen the wound pipe along the gap between the lamina of adjacent convolutions. This gap 54, is shown in FIG. 8.

By providing reinforcement on top of the lock between adjacent convolutions of the composite strip and over the region where the lamina is discontinuous, a pipe capable of withstanding high pressure can be produced.

A fourth embodiment of the invention is shown in FIG. 9. This embodiment of the invention is similar to the third embodiment of the invention except instead of providing an additional rib and reinforcing member over the joint area, the female lock section has a thick wall to provide the pressure capacity where the lamina is discontinuous.

Figure 10:
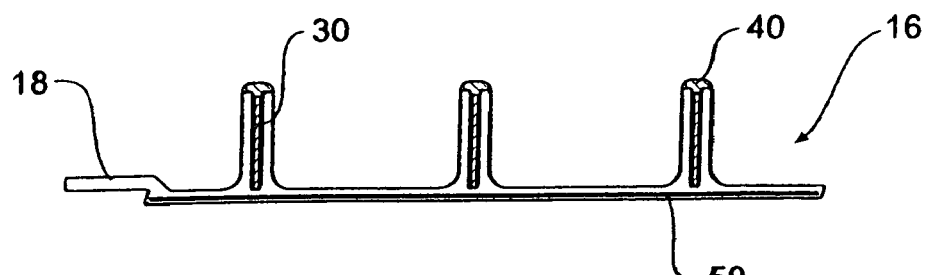
FIG. 10 shows a cross sectional view of a composite strip according to a fifth embodiment of the invention.

A fifth embodiment of the invention is shown in FIG. 10 where no additional features are provided between adjacent convolutions to cover the area in which the laminae are discontinuous.

Figure 11:
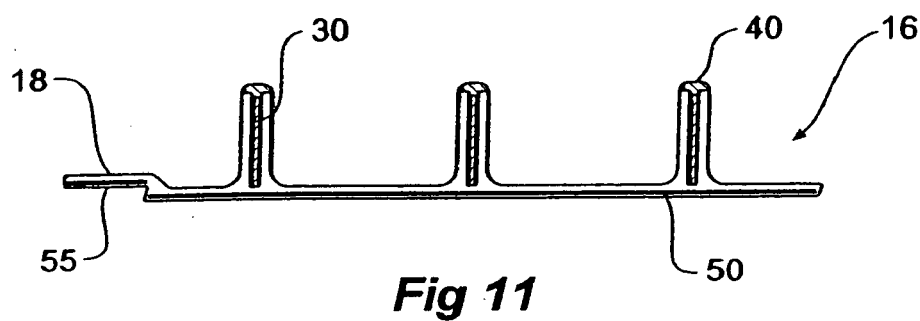
FIG. 11 shows a cross sectional view of a composite strip according to a sixth embodiment of the invention.

A sixth embodiment of the invention is shown in FIG. 11. With this embodiment of the invention, an additional lamina is welded to the edge section of the profile as illustrated.

Figure 12:
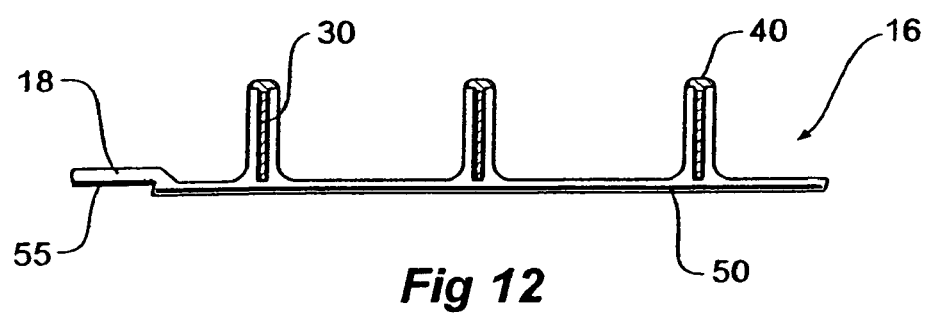
FIG. 12 shows a cross sectional view of a composite strip according to a seventh embodiment of the invention.

A seventh embodiment of the invention is shown in FIG. 12. This embodiment of the invention differs slightly to the above-described embodiment in that the additional lamina 55 is inserted during the pipe winding process.

Figure 13:
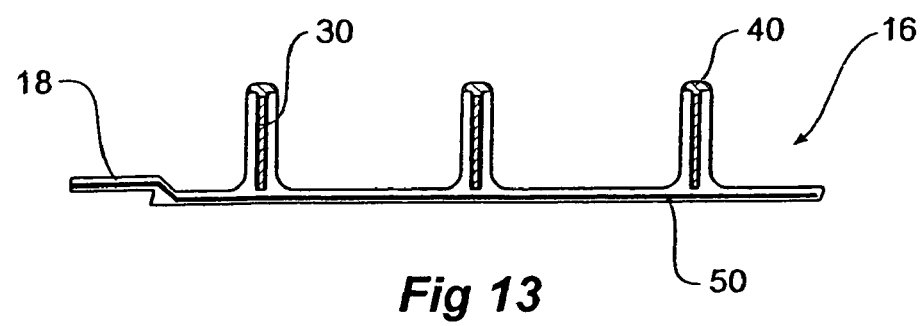
FIG. 13 shows a cross sectional view of a composite strip according to a eighth embodiment of the invention.

A final embodiment of the invention is shown in FIG. 13. With this embodiment of the invention, a continuous lamina is either cross head extruded in the profile base 12 and edge locking areas or is welded to the base after extrusion.

Other embodiments of the invention may be provided with the lamina either bonded to the base of the strip 12 or embedded within the base of the strip 12.

Materials having directional properties may be used as or within the lamina. For instance, orientated plastic film strips that are strong in a longitudinal direction and weak in a transverse direction may be used. Such strips may improve the "hoop" strength of the wound pipe.

Plastic film strips that are strong in a transverse direction and weak in a longitudinal direction may also be used.

In some applications it will be desirable to form a lamina from two (or more) plastic film strips that are strong in mutually orthogonal directions thereby resulting in a composite of high strength in all directions.

Examples of suitable materials having directional properties include highly stretched polyolefin sheet. Such sheets have a high proportion of molecules orientated in the same direction which provides a high Young's modulus and yield strength.

Currently, helically wound composite pipes are formed in multi-stage operations. Generally a plastics body is extruded within a factory environment and is then wound onto a spool for transport. The extruded strip is then unwound from the spool and passed through a winding machine that can also be located within a factory or alternatively can be located at the site where the final pipe is required. Finally, elongate steel reinforcing strips are rolled onto the newly wound pipe. In many applications, the steel reinforcing strips are pre-rolled to a radius approximating that of the helically wound plastics body before they are introduced onto the outside of the plastics pipe to form a composite pipe with a requisite stiffness. The pre-bending of the reinforcing strip is required where reinforcing members have a high degree of stiffness through the relevant bending axis.

The process of forming a helical pipe from the profile described above with reference to FIGS. 1, 2, 3, 5 and 6 is simplified since the reinforcing members 30 are introduced into the strip at an early stage of manufacture and before the pipe is wound.

Figure 6:
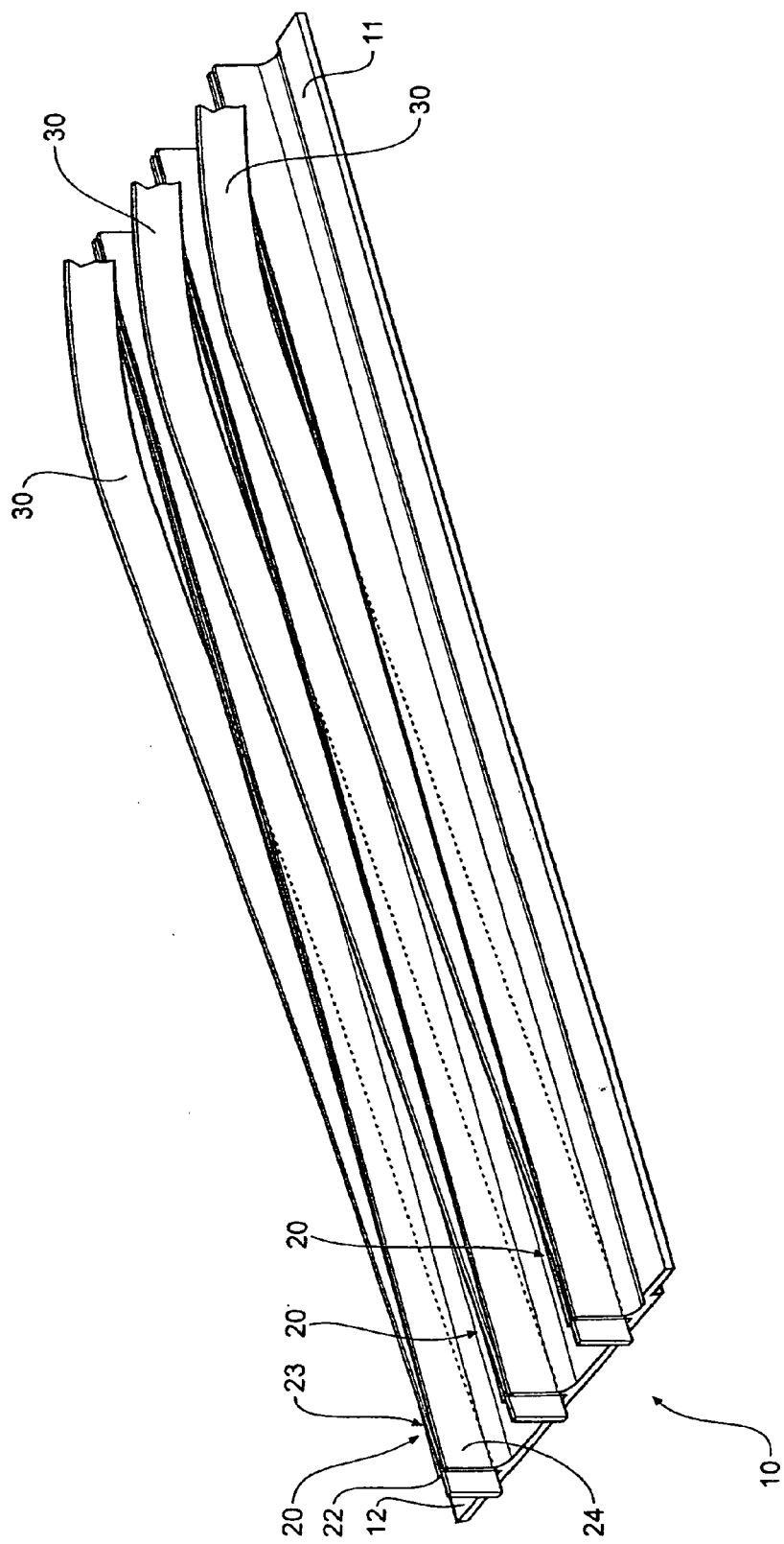
FIG. 6 is a perspective view showing the reinforcing element being introduced to the profile.

A method of constructing a composite strip 10 windable to form a helical pipe is shown in FIG. 6. A plastics strip 11 is extruded having a substantially flat sided base portion and an array of parallel spaced apart length wise extending rib portions 20 upstanding from the base portion 12. Next a plurality of elongate metal reinforcing strips 30 are introduced the rib portions 20. The reinforcing strip 30 has a height to thickness ratio of at least four to one and is orientated substantially perpendicular to the flat side 14 of the base portion 12.

The introducing or inserting step described above occurs while the plastic strip is lying substantially flat. The reinforcing strips 30 are inserted straight without any pre-bending. Finally beads of plastic 40 (as shown in FIGS. 1 and 2) are extruded onto the tops of the rib portions 20 to encapsulate the reinforcing strips 30.

A further method of constructing a composite strip windable to form a helical pipe is as follows. Plastics material and steel strip are introduced into an extrusion cross-head die where the two materials are integrated into one composite profile, such as the composite strip described above and shown in FIG. 3. A composite strip formed by cross-head extrusion may differ slightly from the profile described above in that the beads of plastic 40 (as shown in FIGS. 1 and 2) would not be required—instead, the cross-head extrusion die could be designed such that the steel strip exits the die completely encapsulated with plastics material.

Having produced a composite reinforced strip, it is possible to directly wind that strip into a helically wound pipe such as the pipe shown in FIG. 4 or alternatively, the strip can be rolled onto a spool for later use.

The ability to roll the composite profile onto a spool for transport provides a number of advantages. For instance, a single spool can be transported to the field and positioned adjacent a pipe winding machine located where the final pipe is required. Composite pipe can then be helically wound in a single operation without the need for large amounts of specialised equipment.

In order to be able to spool the straight composite strip 12 withut the steel reinforcing strips 30 buckling it was necessary to develop a new method of spooling. Existing conventional spooling methods create a strip path that reverse bends the strip and then straightens it prior to the strip going onto the hub of the spool. The spool is rotated about a horizontal axis with the strip being fed to the top or upperside of the spool. For plastic strips without steel this method is satisfactory. However, when there is steel reinforcing in the strip, this method is not suitable as it causes the steel reinforcing 30 to buckle.

Figure 14:
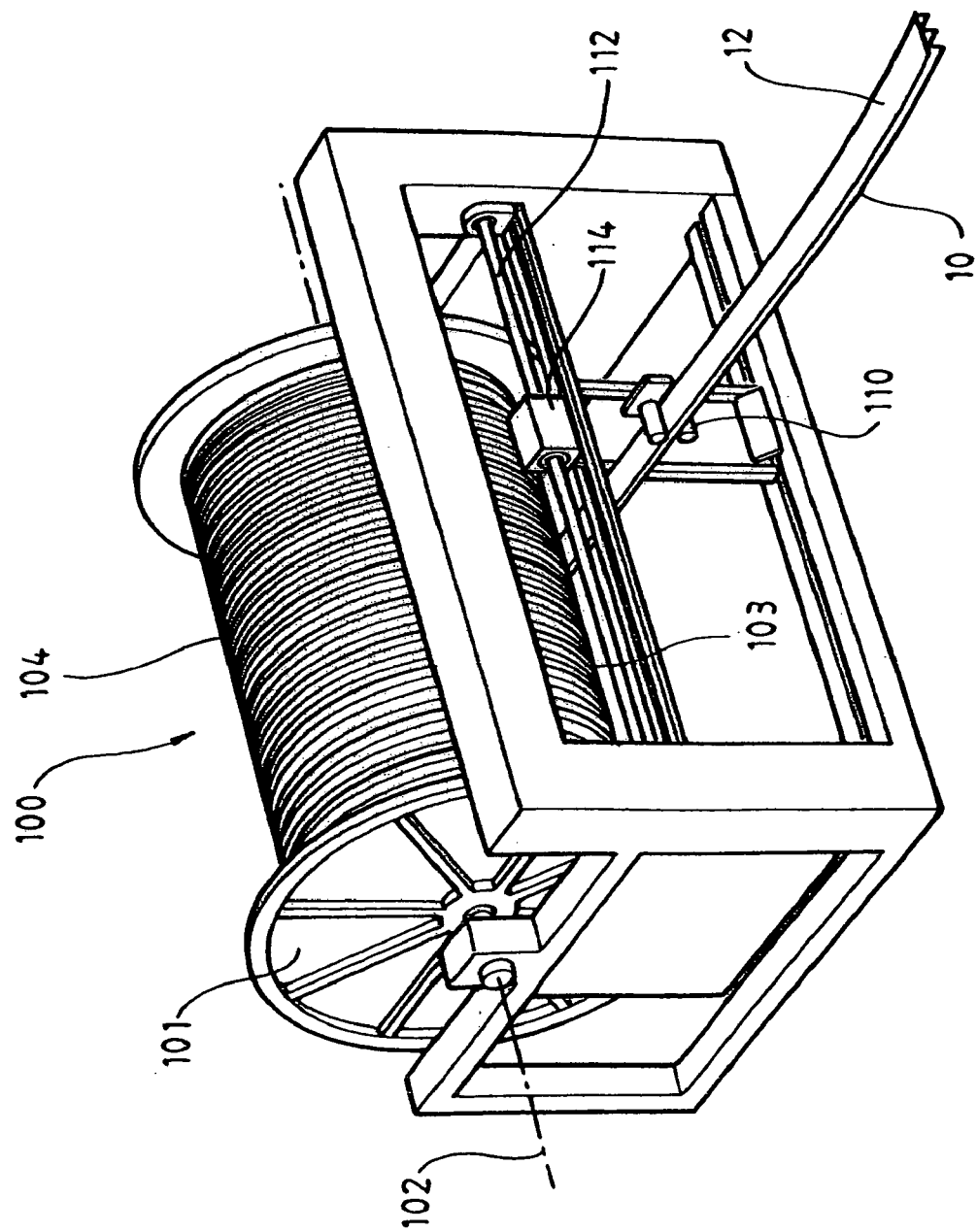
FIG. 14 shows a perspective view of a spool drive assembly for use with embodiments of the invention.

FIG. 14 shows a spool drive assembly 100 developed for spooling steel reinforced composite strip 10. The spool 101 is supported for rotation about a horizontal axis 102. A strip guide 110 is provided to distribute the strip 10 across the width of the spool's hub. An endless pneumatic cylinder 114 driving on a rod 112 drives the strip guide 110 back and forth.

The spooling method developed for steel reinforced strip and shown in FIG. 14 has a strip path that minimises any load applied to the strip that could cause buckling. The strip path onto the spool 101 with this arrangement is a straight path to the bottom or underside 103 of the spool with the ribs facing down and hence the base portion 12 facing up allowing the strip to be bent in the correct orientation on the spool (ribs facing outwards, as they do in the wound pipe).

The method of controlling the speed of rotation of the spool 101 developed for this new method relies on the tension in the strip 10 (torque on the motor). In addition to changing the spooling methods, the optimum spool hub size needs to be selected to prevent the ribs buckling during the spooling process. An initial hub size of 450 mm was trialed which was suitable for some of the steel thicknesses, however as the steel becomes thicker and taller the hub size needs to be increased. For the current strip 10 made for pipes up to 750 mm in diameter, a hub size of 1000 mm is required.

The profiles of the second to eighth embodiments of the invention as illustrated in FIGS. 7 to 13, can be constructed using the method described above for the profile of the first embodiment of the invention as shown in FIGS. 1 to 6. The lamina can be introduced in a separate step after the strip has been extruded.

While the present invention has been described in terms of a preferred embodiment in order to facilitate better understanding of the invention, it should be appreciated that various modifications can be made without departing from the principles of the invention. Therefore, the invention should be understood to include all such modifications within its scope.

The claims defining the invention are as follows:

1. A helically wound composite pipe produced from a composite strip, the composite strip comprising:
    an elongate plastic strip having a base portion that forms the inside of the wound pipe and a lengthwise extending rib portion upstanding from the base portion;
    an elongate reinforcing strip extending adjacent to or integral with the rib portion; and
    an elongate planar lamina extending lengthwise and bonded to the base portion, the lamina having a higher Young's modulus and strength than those of the plastic strip.

2. A pipe as claimed in claim 1 wherein adjacent wound convolutions of the lamina of the pipe are not directly bonded together.

3. A pipe as claimed in claim 2 wherein the lamina comprises fibre fabric.

4. A pipe as claimed in claim 3 wherein the fibre fabric comprises glass fibre.

5. A pipe as claimed in claim 4 wherein the rib portion comprises a pair of parallel walls extending lengthwise along the base portion, the rib portion defining a lengthwise extending slot in which the reinforcing strip is retained, the strip being laterally supported by the walls of the slot.

6. A pipe as claimed in claim 5 wherein the walls are orientated substantially perpendicular to the base portion.

7. A pipe as claimed in claim 6 wherein the reinforcing strip is continuous and has a length which is co-extensive with the plastic strip.

8. A pipe as claimed in claim 7 wherein the reinforcing strip is completely encapsulated so as to prevent exposure to the environment.

9. A pipe as claimed in claim 8 wherein the plastic strip has an array of lengthwise extending slot forming rib portions spaced apart across the width of the strip, each rib portion supporting an elongate reinforcing strip.

10. A pipe as claimed in claim 9 wherein the reinforcing strip is constructed from metal.

11. A pipe as claimed in claim 10 wherein the reinforcing strip is constructed from steel.

12. A method of producing a helically wound steel reinforced plastics pipe comprising the steps of:
    extruding a plastics profile having a base portion and a lengthwise extending rib portion upstanding from the base portion;
    extruding a lamina into the base portion, the lamina having a higher Young's modulus and strength than those of plastic strip;
    introducing an elongate metal reinforcing strip into the rib portion, the metal strip having a height to thickness ratio of at least three to one and orientated substantially perpendicular to the base portion, thereby producing a composite strip;
    helically winding the composite strip; and
    inter-engaging the adjacent edges of adjacent convolutions of the strip so as to form a helical pipe.

13. A method as claimed in claim 12 wherein the steps of extruding are cross-head extruding.

14. A method as claimed in claim 13 wherein the lamina comprises fibre fabric.

15. A method as claimed in claim 14 wherein the fibre fabric comprises glass fibre.

16. A method as claimed in claim 15 wherein the rib portion is extruded to define a lengthwise extending slot shaped to support the reinforcing strip.

17. A method as claimed in claim 16 wherein the rib portion is extruded to comprise a pair of parallel walls extending lengthwise along the base portion, the walls orientated substantially perpendicular to the base.

* * * * *

UNITED STATES PATENT AND TRADEMARK OFFICE
CERTIFICATE OF CORRECTION

PATENT NO. : 7,174,922 B2  Page 1 of 1
APPLICATION NO. : 11/348285
DATED : February 13, 2007
INVENTOR(S) : Ian Roger Bateman and Gulcay Uysal It is certified that error appears in the above-identified patent and that said Letters Patent is hereby corrected as shown below:

INSERT ON THE TITLE PAGE:

item 63 Insert

--Related U.S. Application Data

Continuation of 10/433,768, filed on June 5, 2003, now U.S. Patent No. 7,004,202 B2, issued on February 28, 2006--

Signed and Sealed this

Second Day of September, 2008

JON W. DUDAS
*Director of the United States Patent and Trademark Office*